(12) United States Patent
Wilson

(10) Patent No.: US 6,228,411 B1
(45) Date of Patent: May 8, 2001

(54) DOUGH PRE-SHEETING SYSTEM AND METHOD

(76) Inventor: Barry F. Wilson, 9526 Ann St., Santa Fe Springs, CA (US) 90670

( * ) Notice: Subject to any disclaimer, the term of this patent is extended or adjusted under 35 U.S.C. 154(b) by 0 days.

(21) Appl. No.: 09/522,788

(22) Filed: Mar. 10, 2000

(51) Int. Cl.[7] ................................ A21C 3/00; A21D 6/00
(52) U.S. Cl. .................... 426/502; 425/325; 425/363; 426/516; 426/517
(58) Field of Search .................................. 426/502, 516, 426/517; 425/325, 363, 376.1; 264/210.1, 211.12

(56) References Cited

U.S. PATENT DOCUMENTS 3,303,796 * 2/1967 Novissimo ........................... 426/517
3,332,781 * 7/1967 Benson et al. ....................... 426/502

* cited by examiner

Primary Examiner—George C. Yeung
(74) Attorney, Agent, or Firm—Edgar W. Averill, Jr.

(57) ABSTRACT

A dough pre-sheeting system within a food processing system having a receptacle for receiving dough and an extrusion die with an elongated-slot die opening. Dough is pressure fed from the receptacle through the elongated-slot die opening preferably by multiple augers, and emerges from the extrusion die as a continuous sheet having a generally uniform thickness. The continuous sheet of dough is then received by sheeter rollers for further sheeting and thickness reduction. Additionally, a method of pre-sheeting dough utilizes the dough pre-sheeting system described above for extruding a first continuous sheet of dough which is subsequently received by the sheeter rollers for further sheeting.

13 Claims, 4 Drawing Sheets

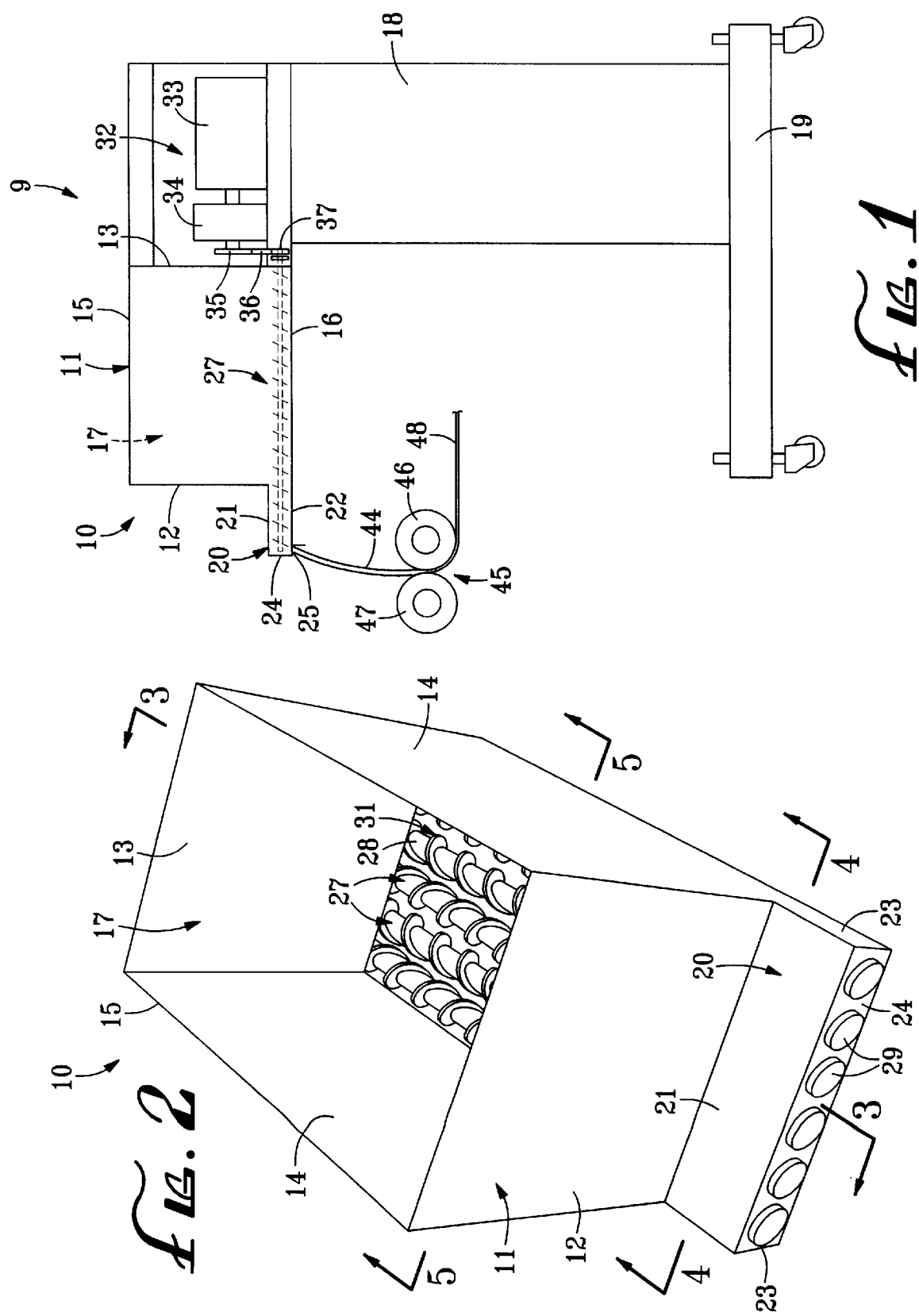

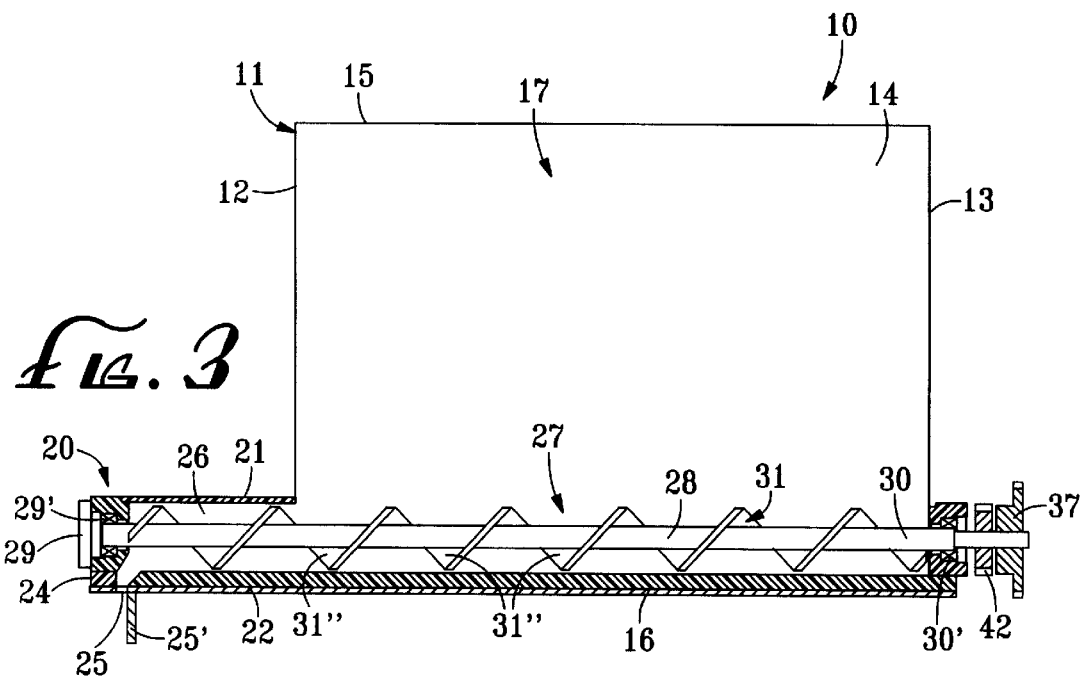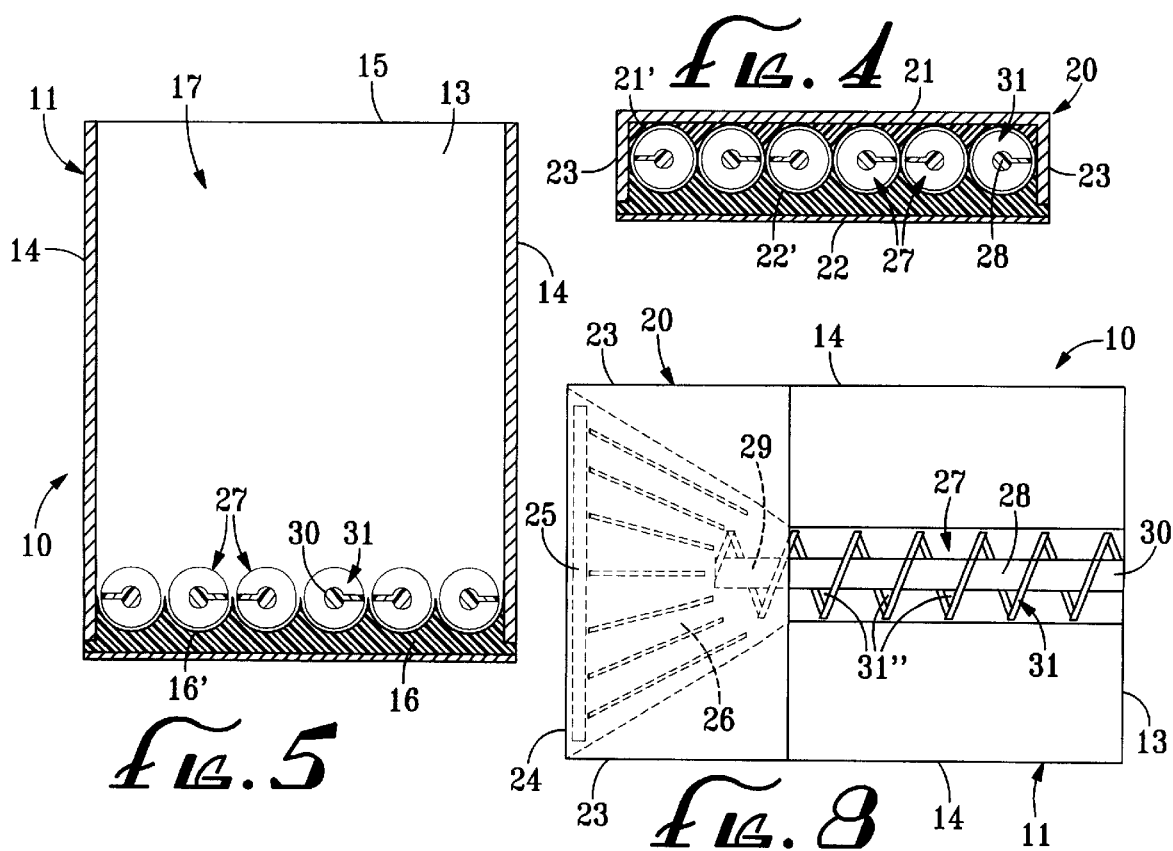

US 6,228,411 B1

DOUGH PRE-SHEETING SYSTEM AND METHOD

BACKGROUND OF THE INVENTION

The field of the invention generally pertains to dough sheeters and methods of sheeting dough for making flattened food products, such as tortillas, tortilla chips, etc. The invention relates more particularly to a dough pre-sheeting system and method which extrudes relatively thin sheets of dough in preparation for further sheeting and processing within a flattened food product processing system.

Tortillas and tortilla products, such as tortilla chips, are flat food products made from "masa," a corn based dough, and are widely consumed throughout the world. Their flat shape is produced by continuous sheeting machines, i.e. "sheeters," commonly used in the food processing industry. Typically, sheeters utilize a pair of generally opposed cylindrical rollers, known as "sheeter rollers," separated by a small gap through which masa dough is roll-compressed and formed into flat, continuous masa sheets.

Due to the growing popularity of tortillas and tortilla chips, various developments in sheeter and sheeting system design have been made to improve production as well as quality of tortilla products. One such development has been to incorporate the use of pre-sheeting devices which prepare the masa for final sheeting by the sheeter rollers. Pre-sheeting devices operate to keep irregular clumps of masa from reaching the sheeter rollers by initially forming them into first drafted masa sheets with a relatively uniform first thickness. These are then fed into the sheeter rollers to produce a final thickness, which is generally retained throughout subsequent processing steps, e.g. cutting, baking, packaging, etc.

An example of a pre-sheeting device is shown in U.S. Pat. No. 5,635,235 disclosing a method of handling masa. As can be seen in FIG. 7, the pre-sheeting device is a pair of cylindrical primary rollers 54 located upstream and arranged in series with a pair of cylindrical sheeter rollers 56 to reduce the thickness of masa dough in succession. The primary rollers 54 receive masa from a hopper 40 having counter rotating shafts 52 with rectangular projections 122 which drive the masa through a slot 116 and onto the primary rollers 54. Additionally, the '235 patent illustrates the use of a mixing extruder 16 which mixes and feeds a continuous stream of masa through a circular nozzle 22. The stream of masa is then broken into masa logs 74 for transfer and distribution to one or more hoppers.

Although not directed to masa pre-sheeters, another example of a pre-sheeting device is shown in U.S. Pat. No. 5,096,729 disclosing a blanching system for processing pasta. The blanching system has an extruder 12 which extrudes a pasta strand 13 from a kneader/sheeter 10 prior to being guided into a blanching tank 16. Although details of the extruder 12 is not disclosed, FIGS. 1, 2, and 4 show the extruder 12 as a pair of cylindrical sheet rollers similar to sheet rollers 14.

One drawback of the cylindrical roller-type pre-sheeting devices used in the '235 and '729 patents is the high costs associated with them. Typically, sheeter rollers are made from precision-machined steel cylinders having smooth, high-precision surfaces. The high-precision surfaces are necessary to achieve the typical sheet production thicknesses of less than 0.1 inch. Additionally, while these steel cylinders are usually hollowed out to reduce weight, they remain sufficiently massive and heavy in order to exert the required pressure for sheeting. Because of their size and bulk, these steel cylinders typically require a large amount of space, as well as require larger, more powerful motors to rotate the steel rollers.

In addition to being costly, another drawback of cylindrical roller-type pre-sheeting devices is that they do not effectively condition and prime the masa to improve its cohesive strength. Because the granularity of masa is relatively coarse compared to flour dough, masa has little cohesive strength, and is thus easily breakable when formed into relatively thin sheets. Roller-type pre-sheeters typically do not improve masas ability to better withstand the stresses involved in later processing steps because the degree and duration of pressure applied to the masa is limited to the single pressure/pinch point in the gap between the sheeter rollers as the masa passes through the gap. This does not give the masa sufficient time to mix or organize its particle structure to thereby better maintain its shape and structure. Moreover, the single pinch point is typically insufficient to dissipate air bubbles trapped in the masa, which can adversely affect the consistency. Because of this inadequacy, additional mixing equipment is typically required, such as the mixing extruder 16 in the '235 patent, to pre-mix masa prior to being roll-sheeted. These additional equipment can increase the production costs substantially.

Another drawback of cylindrical roller-type pre-sheeter devices is that because masa dough is relatively sticky compared to flour dough, it is more likely to stick to the pre-sheeting roller surfaces, notwithstanding the use of blades 132 as shown in the '235 patent. Moreover, masa dough may accumulate on the blades 132 themselves.

Thus, while it is desirable to provide and incorporate a pre-sheeting device to a masa sheeting system, the present systems and methods of pre-sheeting may be inadequate to provide efficient, durable, and consistent production of quality flattened masa food products. There is a need to provide a pre-sheeting device or system capable of consistently producing first drafted masa sheets having a uniform thickness, to ensure a quality final product without straining or jeopardizing the production equipment.

BRIEF SUMMARY OF THE INVENTION

It is an object of the present invention to provide a simple, efficient, and cost-effective dough pre-sheeting system capable of extruding continuous sheets of dough in preparation for further sheeting and processing in a food processing system.

The present invention is for a dough pre-sheeting system which extrudes relatively thin sheets of dough in preparation for further sheeting and processing within a flattened food product processing system. The dough pre-sheeting system comprises a receptacle having an entrance portion for receiving dough, which is connected to an extrusion die having an exit opening with an elongated slot cross-section. A means for feeding dough under pressure operates to feed dough from the receptacle through the exit opening, and to thereby extrude a first continuous sheet of dough having a uniform first thickness. The first continuous sheet of dough is received by means for sheeting the first continuous sheet of dough, which operates to further reduce the thickness of the dough by producing a second continuous sheet of dough having a second thickness which is less than the first thickness of the first continuous sheet of dough. The second continuous sheet of dough is subsequently further processed in the food processing system and a final product is produced.

Additionally, the present invention is for a method of pre-sheeting dough utilizing the dough pre-sheeting system described above. The method comprises the steps of placing dough in the receptacle connected to the extrusion die, feeding dough under pressure from the receptacle through the exit opening of the extrusion die by means for feeding dough under pressure to form the first continuous sheet of dough, receiving the first continuous sheet of dough onto the means for sheeting, and sheeting the first continuous sheet of dough to produce the second continuous sheet of dough having a thickness less than the first continuous sheet of dough.

BRIEF DESCRIPTION OF THE DRAWINGS

FIG. 1 is an elevational view of the dough pre-sheeting system, illustrating the production flow of masa between the extrusion die of the pre-sheeter and the sheeter rollers.

FIG. 2 is a perspective view of the pre-sheeter.

FIG. 3 is a cross-sectional view of the pre-sheeter taken along the line 3—3 of FIG. 2.

FIG. 4 is a cross-sectional view of the extrusion die of the pre-sheeter taken along the line 4—4 of FIG. 2.

FIG. 5 is a cross-sectional view of the receptacle of the pre-sheeter taken along the line 5—5 of FIG. 2.

FIG. 8 is a plan view of a second preferred embodiment of the pre-sheeter utilizing a single auger, with the extrusion die partly in phantom view.

DETAILED DESCRIPTION OF THE PREFERRED EMBODIMENTS

Figure 6:
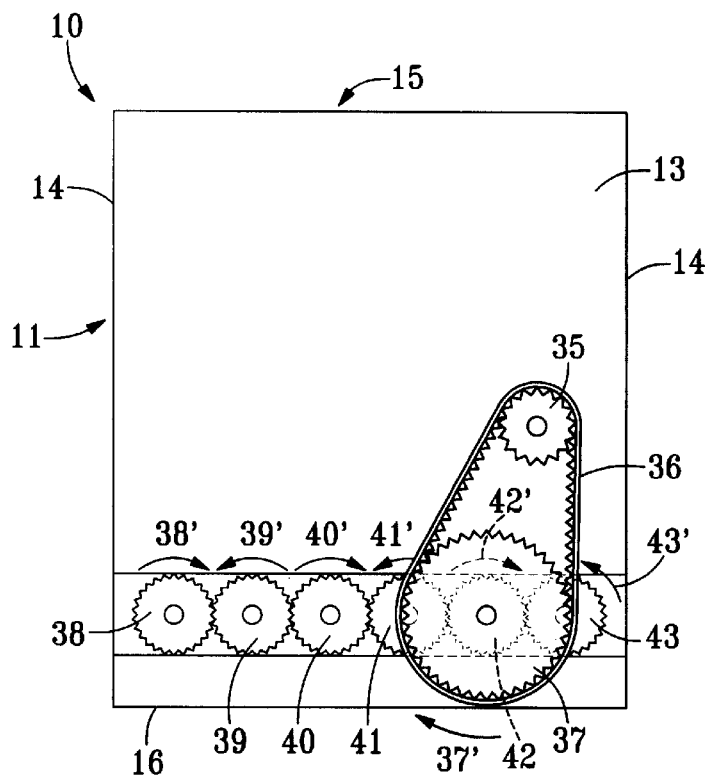
FIG. 6 is an elevational view of the pre-sheeter as generally seen from the rear, illustrating the power train.

Referring now to the drawings, FIG. 1 shows an elevational view of a preferred embodiment of the dough pre-sheeting system, generally indicated at reference character 9, and illustrates the production flow of continuous sheets of dough 44 and 48. The dough pre-sheeting system 9 is ideally part of a larger food processing system (not shown) designed for commercial production of "masa" based food products, such as tortillas and tortilla chips, but is not limited only to such. The term "masa" as used herein and in the claims is therefore intended to refer to food based dough, especially corn dough, as well as other dough such as potato dough, having similar characteristics to masa, e.g. similar consistency, plasticity, constitution, etc.

As generally shown in FIG. 1, the dough pre-sheeting system 9 includes a pre-sheeter, generally indicated at reference character 10, and means for sheeting, generally indicated at reference character 45, positioned downstream from the pre-sheeter 10. The means for sheeting 45 is preferably a type of sheeter commonly used in the food processing industry comprising a pair of generally opposing cylindrical sheeter rollers 46, 47. The sheeter rollers 46, 47 are separated by a small gap through which masa is roll-compressed and formed into flat, continuous masa sheets. And preferably, the pre-sheeter 10 is elevated above the means for sheeting 45 by a frame structure having an elevational portion 18 secured to a base 19. This configuration allows the means for sheeting 45 to directly receive a first continuous masa sheet 44 for further sheeting into a second continuous masa sheet 48. Alternatively, the first continuous masa sheet 44 can be conveyed to the means for sheeting 45 in substantially the same shape and form.

As shown in FIGS. 1–3, and 7, the pre-sheeter 10 includes a receptacle, also known as a "hopper," generally indicated at reference character 11, and having an entrance portion 15 for receiving masa. The receptacle 11 preferably has an open box configuration with a front wall. 12, a rear wall 13, a pair of opposing sidewalls 14, and a lower portion 16. Together, these enclose a receptacle volume 17. The entrance portion 15 is preferably an open top end 15 opposite the lower portion 16 for receiving masa into the receptacle volume 17. In one embodiment, the receptacle 11 additionally has a hinged wall (not shown) positioned adjacent means for feeding dough under pressure 27 (discussed in detail below), and capable of swinging outward to allow access to the means for feeding 27 for cleaning and maintenance. Additionally, the hinged wall can be positioned below the means for feeding 27, and capable of swinging outward in a downward direction.

As can be seen in FIGS. 5, the lower portion 16 of the receptacle 11 has a corrugated inner surface 16' with corrugations running longitudinally between the front wall 12 and the rear wall 13. The corrugations are curvilinearly contoured to a portion of the means for feeding 27, which is preferably at least one auger 27 (discussed in detail below). The lower portion 16 is preferably made from a suitable polymeric material, whereby the corrugated inner surface 16' can be formed by conventional machining and manufacturing methods. And the receptacle 11 is made from a suitably rigid material, such as metal, plastic, etc., capable of containing masa dough therein.

As shown in FIGS. 1–4, and 7, the pre-sheeter 10 additionally includes an extrusion die 20 preferably connected to the front wall 12 of the receptacle 11 near the receptacles lower portion 16. The extrusion die 20 has a die upper wall 21, a die lower wall 22, a die front wall 24, and a pair of opposing die sidewalls 23, which together enclose a compression cavity 26. The extrusion die 20 also has an exit opening 25 with an elongated slot cross-section, which forms the masa into the shape and thickness of the exit opening 25 when pressure-fed therethrough. As can be best seen in FIGS. 3 and 8, the exit opening 25 is located near the die front wall 24, and preferably where the die front wall 24 intersects the die lower wall 22. The die sidewalls 23 are preferably co-extensive with the corresponding sidewalls 14 of the receptacle 11, and the die lower wall 22 is also preferably co-extensive with the lower portion 16 of the receptacle 11. The extrusion die 20 is connected to the receptacle 11 such that the receptacle volume 17 leads into the compression cavity 26.

Additionally, as can be best seen in FIG. 4, the die upper 21 and lower 22 walls preferably have corrugated top 21' and bottom 22' inner surfaces which are shaped to curvilinearly contour a portion of the at least one auger 27 (discussed in detail below), preferably in a manner similar to the corrugated inner surface 16 of the receptacle 11. The corrugated bottom inner surface 22' coextensively aligns with the corrugated inner surface 16' of the receptacles lower portion 16, whereby the corrugations are continuous from the die front wall 24 to the rear wall 13 of the receptacle 11.

As can be seen in FIGS. 1–8, the pre-sheeter 10 includes means for feeding dough under pressure, generally indicated at reference character 27, which continuously feeds masa from the receptacle 11 to the extrusion die 20. Preferably, the means for feeding dough under pressure 27, is at least one auger 27 longitudinally positioned normal to the elongated slot cross-section of the exit opening 25, and rotationally driven by auger driving means, generally indicated at reference character 32. Preferably still, as shown in FIGS. 1–7, six augers 27 are utilized which are positioned parallel to each other in a common plane. The augers 27 are geared to rotate in a direction opposite that of an adjacent auger (See FIG. 6). Each auger 27 includes an auger shaft 28 having a front end 29 rotatably secured to the die front wall 24 of the extrusion die 20, and a rear end 30 rotatably secured to the rear wall 13 of the receptacle 11. Thrust bearings 29' and 30' may be used on both the front 29 and rear 30 ends to support the augers 27 and facilitate rotary motion.

Figure 7:
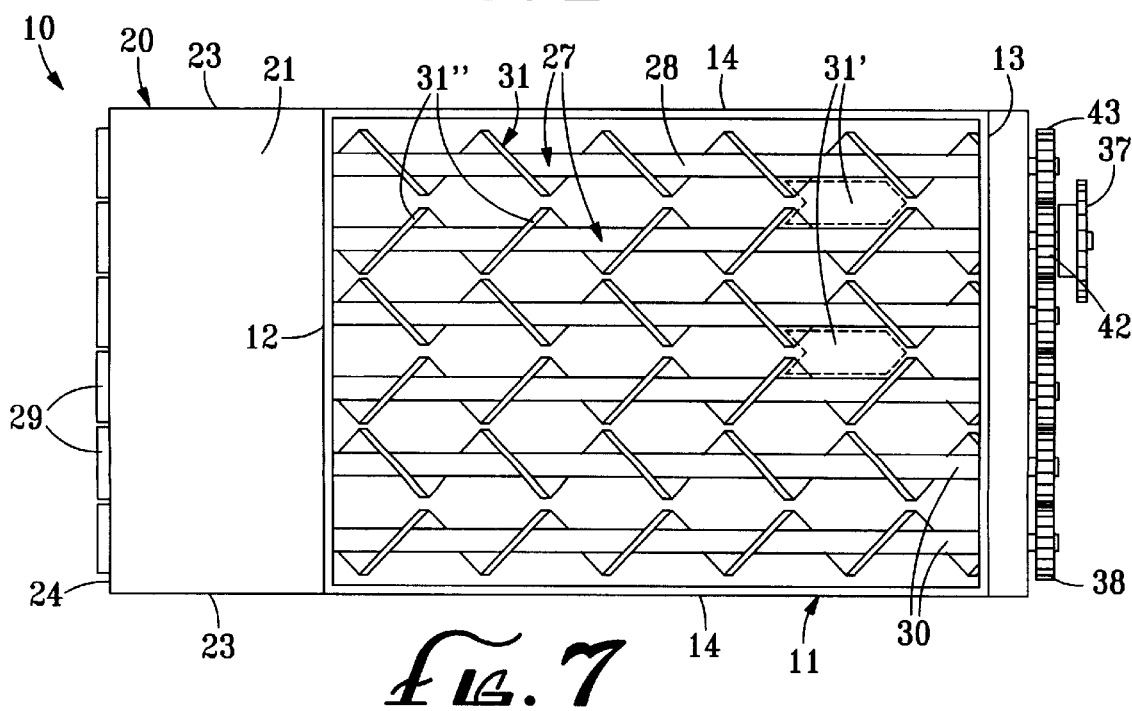
FIG. 7 is a plan view of the pre-sheeter.

Further, each auger 27 has an auger thread, generally indicated at reference character 31, connected to the auger shaft 28 in a generally continuous, spiral or helical manner from the front end 29 to the rear end 30. (see discussion of a discontinuous-spiral embodiment below). As can be seen in FIGS. 3 and 7, the spiral configuration of the auger thread 31 creates multiple thread tiers 31" arranged longitudinally along the auger shaft 28. Preferably, as can be best seen in FIG. 7, the thread direction of each auger thread 31 is opposite that of its two adjacent auger threads. And each auger thread 31 is contiguously arranged with its two adjacent auger threads to form a plurality of scooped pockets 31'. The scooped pockets 31' function to "carry" masa from the receptacle volume 17 to the compression cavity 26 of the extrusion die 20 when adjacent augers 27 rotate in alternate directions. In order to form complete scooped pockets 31', an even number of augers 27 is therefore preferred where multiple augers 27 are used. The augers 27, are preferably made of a polymeric material produced by conventional machining methods, e.g. lathes, to form the spiraled shaped of the continues auger thread 31.

Figure 9A:
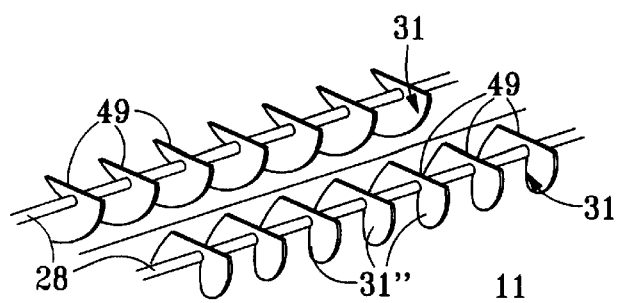
FIG. 9A is a perspective view of a preferred embodiment of the augers having a series of thread gap discontinuities along the auger threads.
Figure 9B:
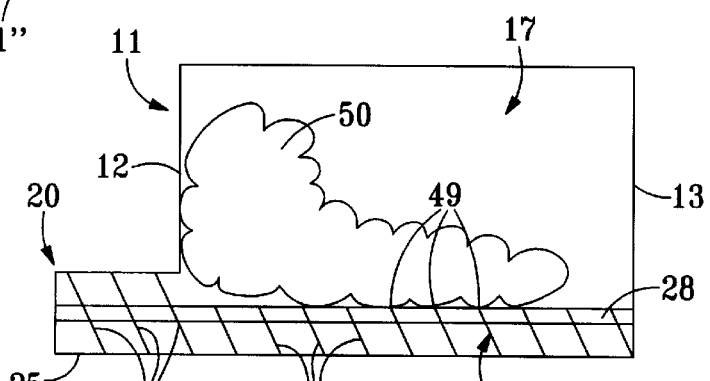
FIG. 9B is an cross-sectional levational view of the pre-sheeter similar to FIG. 3, and incorporating the discontinuous auger.

FIGS. 9A–E illustrate a second embodiment of the augers 27 with the auger thread 31 having discontinuities in its spiral configuration. As shown in FIG. 9B, each thread tier 31" of the auger thread 31 located within the receptacle 11 has a dwell edge 49 which defines a discontinuity in the spiral configuration of the auger thread 31. It is notable, however, that the thread tiers 52 located in the extrusion die 20 do not have dwell edges. As can be best seen in FIG. 9C, the discontinuity is generally a gap in the otherwise circular cross-section of the auger thread 31. The dwell edge 49 and gap produces a dwell interval in the auger rotation when the dwell edge 49 and gap is rotated to face the opening 15 of the receptacle 11. During the dwell interval, masa is not driven or advanced towards the exit opening 25. Rather, during the dwell interval, masa can fall into the gap and press closer to the auger 27, before being taken up and captured by the leading edge of the returning auger thread 31. Consequently, the resulting intermittent dwell/advance action effectively functions to prevent masa (50 in FIG. 9B) from accumulating in the receptacle 11, especially at the front wall 12 (see FIG. 9B).

Figure 9C:
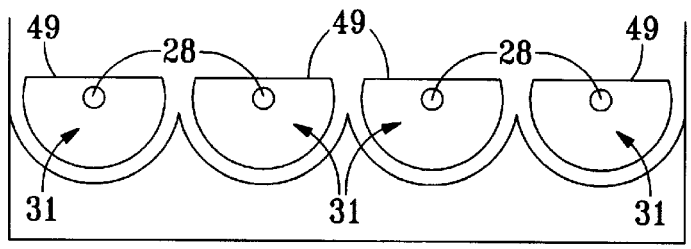
FIG. 9C is an end view of the preferred embodiment of the augers shown in FIG. 9A, illustrating the synchronized aligment of the dwell edges when facing an upward direction.
Figure 9D:
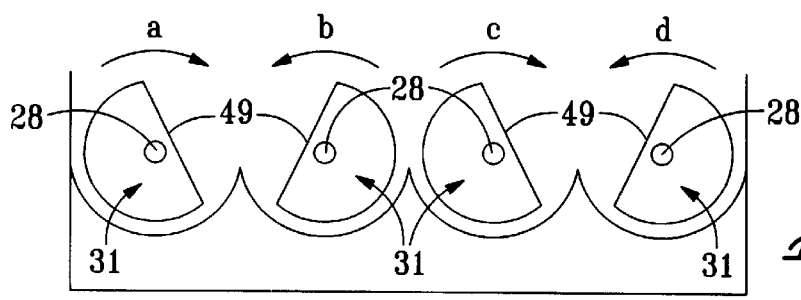
FIG. 9D is an end view of the preferred embodiment of the augers following FIG. 9B, illustrating the rotational synchronization of the dwell edges.
Figure 9E:
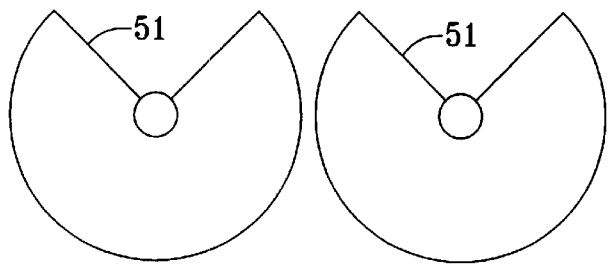
FIG. 9E is an enlarged end view of a set of augers each having a notch for a dwell edge having a notch for a dwell edge.

Preferably, as shown in FIGS. 9C and D, the dwell edge 49 is a chord between two points on the perimeter of a circular cross-section, but is not limited only to such. Any edge defining a gap sufficient to allow masa to fall into the gap during the dwell interval, will enable proper dwell operation of the dwell edge 49. As shown in FIG. 9E, a notch 51 can alternatively be used as a dwell edge. Additionally, the dwell edges 49 of each auger 27 are preferably aligned with each other along an auger shaft 28. Further, as shown by rotational arrows a, b, c, and d in FIG. 9D, the dwell edges 49 of the respective augers 27 of a plurality set of augers are rotationally synchronized to undergo dwell intervals simultaneously.

As can be best seen in FIG. 1, the auger driving means 32 comprises an auger motor 33 preferably connected to a gearbox 34 for suitable gear reduction. The auger motor 33 and gearbox 34 are located near the rear wall 13 of the receptacle 11, and can likewise be supported on the elevational portion 18 of the frame structure. In FIG. 6, the rear wall 13 of the receptacle is shown detailing the auger driving means 32. Each auger 27 has a shaft gear 38–43 fixedly secured to the corresponding rear end 30 of each auger 27. Each shaft gear 38–43 engages with an adjacent shaft gear or gears 38–43 in a linear series, to synchronously rotate in alternating rotational directions. The shaft gears 38–43 are driven by a main drive gear 37 secured to the rear end 30 of one auger shaft 28, and coaxial with one of the shaft gears, 42 in FIGS. 3 and 6. The main drive gear 37 is connected by a drive chain or belt 36 to a pinion gear 35 which is connected to and driven by the gearbox 34.

Operation of the dough pre-sheeting system 9 begins when the receptacle 11 is loaded with masa. This can be accomplished manually, or automatically by suitable conveyor means commonly known in the industry. The auger driving motor 33 then rotates the main drive gear 37 in a direction 37' (clockwise in FIG. 6) by means of the pinion gear 35 and the drive chain or belt 36. Likewise, the shaft gear 42 will rotate in the same direction 42' (clockwise) as the main drive gear 37. Consequently, rotation of shaft gear 42 will induce shaft gears 38–41, and 43 to rotate in opposite directions relative to the rotational directions of adjacent augers. Specifically, shaft gears 38 and 40 will have rotational directions 38' and 40', respectively, in the same clockwise direction as shaft gear 42, and shaft gears 39, 41 and 43 will have rotations 39', 41', and 43', respectively, in the opposite, counterclockwise direction. It is notable that the outer shaft gears 38 and 43 have rotations directed inward toward the center of the receptacle 11 (as seen from the open top end 15). This allows the formation of the scooped pockets 31' which conveys masa into the compression cavity 26 of the extrusion die 20 when the augers 27 rotate. In this manner, clumps of masa are captured in the scooped pockets 31' and transferred to the compression cavity 26.

Additionally, the worm-drive motion of the augers 27 functions to compression-mix the masa, thereby conditioning and priming the masa to improve the masa's cohesive strength. Typically, because the granularity of masa is relatively coarse compared to flour dough, it is not very cohesive, and thus easily breakable when produced into relatively thin sheets. Compression-mixing masa by means of augers 27 enables the masa to better withstand the stresses involved in later processing steps, and thereby maintain its shape and structure. Additionally, the worm-drive motion of the augers 27 operates to dissipate air bubbles trapped in the masa dough better to produce a more uniform consistency.

From the receptacle volume 17, masa is continually driven into the compression cavity 26 of the extrusion die 20 where it accumulates at the die front wall 24. The increasing pressure on the masa forces the masa through the exit opening 25 of the extrusion die as a first continuous masa sheet 44 having a first thickness. As can be seen in FIG. 8, showing a second embodiment of the pre-sheeter 10 with a single auger 27, the compression cavity 27 can be shaped to fan out and expand as it approaches the exit opening 25. This shape helps to exert even pressure on the masa for even extrusion through the exit opening 25. It is notable that the pressure differential inside the compression cavity 26 and immediately outside the exit opening 25, is not sufficiently great to cause possible curling of the extruded first continuous masa sheet 44.

Subsequently, as described previously, the first continuous masa sheet 44 is received by the means for sheeting 45 for further sheeting into the second continuous masa sheet 48 having a second thickness less than the first thickness. One example of a typical thickness reduction between the first 44 and second 48 continuous masa sheets is from 0.06–0.075 inch for the first continuous masa sheet 44 to 0.015–0.020 inch for the second continuous masa sheet 48.

In this manner, the pre-sheeter system 9 can produce stronger first 44 and second 48 continuous masa sheets having more uniform properties which help maintain their shape and structure. Even small breaks and fissures in sheeted masa prior to baking and packaging can cause the finished product, e.g. tortilla chips, to easily break or crumble when packaged. Additionally, because the means for sheeting 45 receives a pre-sheeted first continuous masa sheet 44, the sheeter rollers 46, 47 of the means for sheeting 45 are kept from experiencing variable load conditions caused by irregularities and variations in the clump size and/or consistency of the masa. Consequently, the pre-sheeter 10 can prolong the life of the sheeter rollers 46, 47 by doing the brunt of their work.

Based on the dough pre-sheeting system 9 described above, a dough pre-sheeting method for extruding relatively thin sheets of dough in preparation for further sheeting and processing can also be generally seen in FIG. 1. Operation of the pre-sheeter 10 starts when masa is placed into the receptacle 11. As mentioned previously, this can be accomplished manually, or automatically by suitable conveyor means. The masa is then fed under pressure from the receptacle 11 through the exit opening 25 of the extrusion die 20 as a first continuous masa sheet 44 having a first thickness. This step is preferably an extrusion process accomplished by at least one auger 27. However, it is appreciated that other means for feeding under pressure 27, such as a piston and cylinder arrangement, are contemplated as well. The first continuous masa sheet 44 is then received by the means for sheeting 45 which further sheets the first continuous masa sheet 44 into a second continuous masa sheet 48 having a second thickness less than the first thickness. The second thickness of the second continuous masa sheet 48 produced by the sheeter rollers 46, 47 is retained throughout subsequent processing steps in the larger food processing system, such as cutting, baking, packaging, etc.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A masa dough pre-sheeting system comprising:
    a receptacle having an entrance portion for receiving masa dough;
    an extrusion die connected to said receptacle having an exit opening with an elongated slot cross-section;
    at least two augers arranged parallel to each other in a common plane, with each auger having an auger thread connected to an auger shaft in a spiral configuration forming a plurality of thread tiers, said at least two augers longitudinally positioned normal to said elongated slot cross-section of said exit opening and driven by auger driving means, for feeding masa dough under pressure from said receptacle through the exit opening of said extrusion die in a uniform manner across the span of said exit opening, thereby extruding a first continuous sheet of masa dough having a first thickness; and
    means for sheeting the first continuous sheet of masa dough received from said extrusion die to produce a second continuous sheet of masa dough having a second thickness less than the first thickness of the first continuous sheet of masa dough.

2. The masa dough pre-sheeting system as in claim 1, wherein said at least two augers comprises six augers.

3. The masa dough pre-sheeting system as in claim 1, wherein each thread tier has a dwell edge defining a discontinuity in the spiral configuration of the corresponding auger thread and producing a dwell interval when rotated to face the open end of said receptacle, whereby masa dough received in said receptacle is intermittently agitated and advanced to prevent accumulation therein.

4. The masa dough pre-sheeting system as in claim 3, wherein the dwell edges of each auger align with each other when viewed along the auger shaft of the corresponding auger.

5. The masa dough pre-sheeting system as in claim 4, wherein the dwell edges of said at least two augers are rotationally synchronized to simultaneously face the entrance portion of said receptacle together.

6. The masa dough pre-sheeting system as in claim 1, wherein the auger thread of each auger has a spiral direction opposite that of an adjacent auger, with the auger threads aligned relative to each other to form a plurality of scoop pockets therebetween which function to convey masa dough towards said extrusion die when adjacent augers are rotated in directions opposite each other.

7. A method of pre-sheeting masa dough comprising the steps of:
    placing masa dough in a receptacle connected to an extrusion die having an exit opening with an elongated slot cross-section;
    feeding masa dough under pressure from said receptacle through the exit opening of said extrusion die in a uniform manner across the span of the exit opening by rotating at least two augers having an auger thread connected to an auger shaft in a spiral configuration forming a plurality of thread tiers, with said at least two augers longitudinally positioned normal to the elongated slot cross-section of the exit opening and driven by auger driving means, thereby forming a first continuous sheet of masa dough having a first thickness;
    receiving the first continuous sheet of masa dough onto means for sheeting; and
    sheeting the first continuous sheet of masa dough by said means for sheeting to produce a second continuous sheet of masa dough having a second thickness less than the first thickness of the first continuous sheet of masa dough.

8. The method of pre-sheeting masa dough as in claim 7,
wherein the step of feeding masa dough under pressure includes the step of intermittently agitating and advancing masa dough by providing each auger with a plurality of thread tiers on the corresponding auger thread with each thread tier having a dwell edge which defines a discontinuity in the spiral configuration of the auger thread and produces a dwell interval when rotated to face the open end of said receptacle, and by rotating said at least two augers, for preventing accumulation of masa dough in said receptacle.

9. The method of pre-sheeting masa dough as in claim 7,
wherein the step of rotating the at least two augers comprises rotating each auger in a direction opposite that of an adjacent auger.

10. A dough pre-sheeting system comprising:

a receptacle having an entrance portion for receiving dough;

an extrusion die connected to said receptacle having an exit opening with an elongated slot cross-section;

at least one auger having an auger thread connected to an auger shaft in a spiral configuration forming a plurality of thread tiers, each thread tier having a dwell edge defining a discontinuity in the spiral configuration of the corresponding auger thread and producing a dwell interval when rotated to face the open end of said receptacle whereby dough received in said receptacle is intermittently agitated and advanced to prevent accumulation therein, for feeding dough under pressure from said receptacle through the exit opening of said extrusion die in a uniform manner across the span of said exit opening, thereby extruding a first continuous sheet of dough having a first thickness; and means for sheeting the first continuous sheet of dough received from said extrusion die to produce a second continuous sheet of dough having a second thickness less than the first thickness of the first continuous sheet of dough.

11. The dough pre-sheeting system as in claim 10,
wherein the dwell edges of said at least one auger align with each other when viewed along the auger shaft thereof.

12. The dough pre-sheeting system as in claim 11;
wherein the dough pre-sheeting system includes at least two augers, and wherein the dwell edges of said at least two augers are rotationally synchronized to simultaneously face the entrance portion of said receptacle together.

13. The dough pre-sheeting system as in claim 10,
wherein the dough pre-sheeting system includes at least two augers, and wherein the auger thread of each auger has a spiral direction opposite that of an adjacent auger, with the auger threads aligned relative to each other to form a plurality of scoop pockets therebetween which function to convey dough towards said extrusion die.

* * * * *